Feb. 14, 1928.

C. W. MORGAN 1,659,041

TESTING STAND

Filed May 2, 1924

WITNESSES:
Smith S. Miller
Steve E. Krapcak

INVENTOR
C. W. Morgan

Patented Feb. 14, 1928.

1,659,041

UNITED STATES PATENT OFFICE.

CHARLES W. MORGAN, OF CHICAGO, ILLINOIS, ASSIGNOR OF ONE-HALF TO ANDREW C. LYEN, OF CHICAGO, ILLINOIS.

TESTING STAND.

Application filed May 2, 1924. Serial No. 710,697.

My invention relates to improvements in stands equipped with switchboards and batteries that are used in testing the electrical operation of automobile accessories such as generators, starters, spark coils etc.; and the objects of my improvements are, first, to materially reduce the requisite floor-space dimensions and wiring connections of my test stand below those of stands constructed in the customary form and having an equivalent capacity by devising a new and unusual design and arrangement of the constituent parts; and second, to increase the general utility of the testing stand by separating the constituent parts of the stand into stationary and portable elements, the portable element being adapted to the testing of automobile accessories without their removal from the car.

I attain these objects by the devices illustrated in the accompanying drawings, in which—

Figure 1:
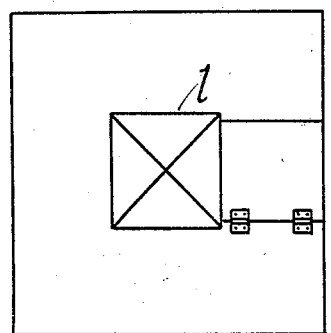
Figure 4:
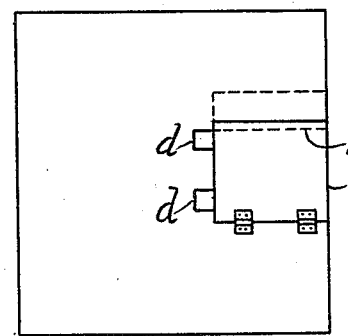
Figures 2, 7:
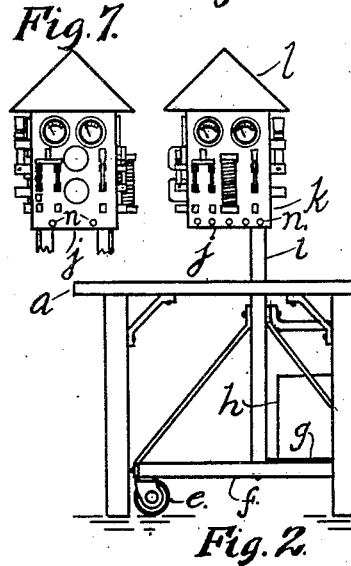
Figure 5:
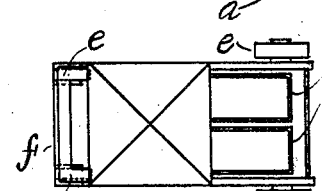
Figures 3, 8:
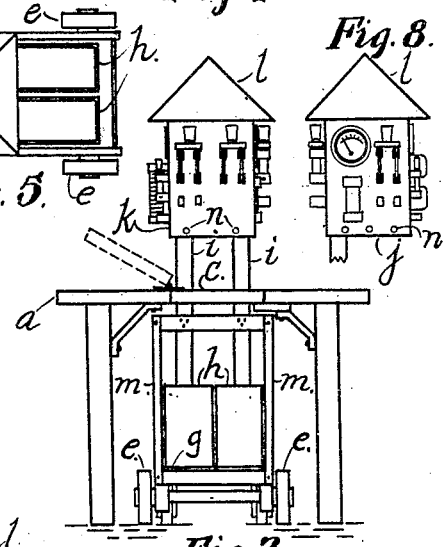
Figure 9:
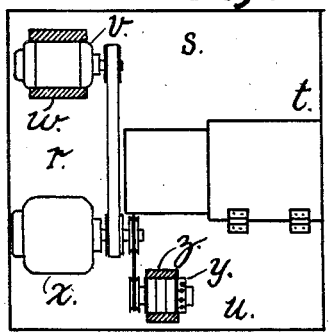
Figure 6:
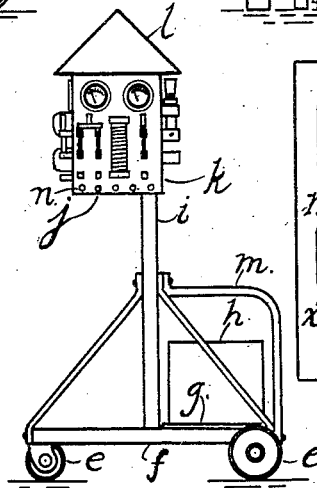
Figure 10:
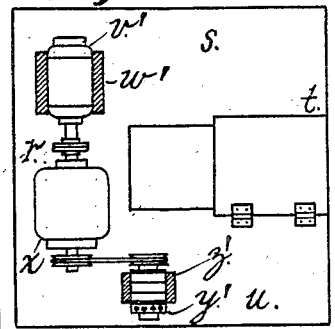

Figure 1, is a plan view of the testing stand with table equipment removed; Figure 2, a side elevation; Figure 3, a front elevation; Figure 4, a plan view of the test table; Figure 5, a plan view of the portable part of the stand; Figure 6, a side elevation; Figures 7 and 8, views of the switchboard; and Figures 9 and 10, are diagrams relating to the arrangement of table equipment that affect specific constructions of the stand.

Similar letters refer to similar parts throughout the several views.

Referring to Figures 1, 2, 3, 4, 5, and 6, the rectangular table $a$, forming the worktable of my test stand, has a rectangular notch $b$ cut in one side. The notch is bridged over by a hinged rectangular drop-leaf $c$. Extension notches $d$, $d$, Figure 4, form openings for uprights $i$, $i$ of the portable element shown in Figure 3, when this is in place in the table.

Referring to Figures 2, 3, 5, and 6, wheels $e$, $e$, $e$, $e$, support a carriage $f$ having a storage battery platform $g$ on which rests storage batteries $h$, $h$. Uprights $i$, $i$, support a box-shaped switchboard $j$ having four panels $k$, $k$, $k$, $k$, all equipped with switchboard appurtenances. The switchboard is covered over by a roof $l$. The several panels of the switchboard are devoted to different classes of testing work. Members $m$, $m$, form handles with which to move the carriage about. $n$, $n$, $n$, etc. are terminals to which cables may be attached during testing operations of automobile generators, starters etc. It is assumed that the appurtenances indicated on the switchboard and the storage batteries are connected by a suitable system of electrical distribution, but the actual wires are omitted in the drawings to avoid confusion.

I will now describe the use of the portable element or test carriage shown in Figures 5, and 6. Suppose it is required to determine the current flow in starting an automobile. The testing carriage is wheeled along the side of the car and appropriate connections made between the starter on the automobile and the switchboard $j$. The current is then registered on one of the switchboard meters.

In using the testing carriage in connection with the table $a$, the drop-leaf $c$ is raised and the carriage shoved into the table and the drop-leaf lowered. The whole outfit is then suitable for bench testing of generators, starting motors, magnetos, igniters, coils etc. each side of the stand and its panel on the switchboard being fitted for certain classes of testing.

The table appurtenances may take a variety of forms and as the showing of them in the first eight figures would considerably complicate the drawings, these have been omitted but have been diagrammatically indicated in plan views Fig. 9 and Fig. 10. There is a certain logical way of arranging these table appurtenances which I have devised which determines an especially convenient sequence of working departments around my testing stand and the respective switchboard panels for each of them, and therefore I will now briefly describe these table appliances and their positions to show the convenience resulting from particular arrangements.

Two important items of equipment on a test stand are a power motor and a special form of vise. The power motor which is often of the reversible, variable speed type is used to drive a generator, magneto or igniter during a test. The special vise is used to hold the outfit being tested in a fixed position on the table. Now it is common practice to drive the generator under test by belt or chain or to direct drive it through some form of universal coupling. In the latter case the vise used provides appropriate means for aligning the shafts of the driving motor and the driven generator. In Figures 9, and 10, I illustrate the positions of the important table devices. Fig. 9, indicates belt drive while Figure 10, shows direct drive. The sides of the test stand in both figures are devoted to the same classes of testing. Side *r* is arranged for generator testing, side *s* to starter testing, side *t* to miscellaneous testing, and side *u* to tests of magnetos, igniters and other devices. Now note that by placing the vise *v* for chain drive, or the vise *v'* for direct drive at or near the corner between sides *r* and *s*, the vise is available for its usual service of holding a generator *w* during a test and is also available for holding a starter when occasion demands. If in either case the power motor *x* be located at some point along the side *r*, it is serviceable not only for driving the generator *w* but is also serviceable for driving simultaneously such a device as an igniter or magneto *y* held in a small vise *z*. In both Figures 9 and 10, the magneto is indicated as being belt driven. In Figure 10, direct drive of the magneto would not be applicable for the reason that the direction of rotation of the motor *x* during the test of a certain kind of generator might conflict with that required by the magneto *y* to be tested. Under such a condition the magneto *y* might be driven on a crossed belt.

In addition to the advantages gained by arranging the table appliances as described, it will be noticed that a further advantage is gained by allotting the testing of generators to that side of my test stand opposite the storage batteries. The switchboard being raised off the bench an appreciable distance, and there being no switchboard supports on the side of the stand opposite the storage batteries, it is possible for a belt or chain to run beneath the switchboard in a shrouded position thus materially protecting the electricians at work around the stand.

From the foregoing discussion of a particularly convenient arrangement of table appliances, it becomes evident that the four panels of my switchboard will be consecutively joined and equipped to conform with the said arrangement. The first panel on the storage battery side of the stand may have equipment adaptable to miscellaneous testing, the second panel includes appurtenances adaptable to magneto and igniter testing, the third panel includes appurtenances adaptable to generator testing, and the fourth panel includes appurtenances adaptable to starting motor testing. It is apparent that by reversing the arrangement of table appliances and the switchboard panels to correspond, we maintain the same relative advantages as outlined.

I will now show how the four departments of my test stand are not merely an aggregation of testing elements but are actually co-operative elements in the performance of testing operations. Those familiar with the art are well aware that such operations as the testing of starting motors, coils, horns etc. will reduce the energy of storage batteries furnishing the power, while the operation of testing a generator will increase the energy of the batteries. Now if separate batteries be used for each department, it is quite apparent that some will soon be partly or wholly discharged while others will soon be overcharged. But when such varied tests are all performed with the same storage batteries, a compensating action results. Energy stored up in one class of tests is dissipated in the performance of other classes of tests. I have specified that the switchboard appliances are connected to some appropriate system of distribution which in turn is connected to the common storage batteries used by all, and therefore cooperation between the several departments does exist through the compensation is electrical energy.

I stated at the outset, that one of the objects of my invention was to construct a test stand that would require considerably less floor space and shorter wire connections than one of equivalent capacity built in the customary manner. I also stated that I desired to increase the general utility of my stand by separating its constituent elements into stationary and portable units. To demonstrate fully that I have attained these objects, it is requisite that I now review the existing state of the art to which my improvement refers so as to compare my stand with others and note its advantages.

There are at the present time, two general classes of testing outfits; the one class consists of portable wheeled outfits commonly termed test carts, and the other class consists of stationary test stands. The test stand usually consists of a table with a rigidly attached switchboard mounted vertically along one edge, thus forming a back. The switchboard is equipped with meters, switches, etc. appropriate to different classes of testing, and beneath the stand there are located storage batteries connected with the switchboard appurtenances according to some desirable system of electrical distribution. These batteries act as sources of electrical energy for testing. On the table of such a stand there are the usual appliances such as power motor, vise, etc. already mentioned. Now this common form of test stand becomes of necessity, very large if it is designed for several electricians to do testing simultaneously as each man needs a reasonable amount of space along the edge of the table. Furthermore, since the switchboard appliances must be convenient to the several operators, these switches, meters, etc.

must be spaced comparatively far apart. Now it becomes apparent that the number of men that can work at such a stand depends more on the periphery of the bench than on its area within certain reasonable limits. Consequently, if the switchboard be mounted vertically along one edge, that edge is wholly lost as working space. The ends too, of such a stand are practically useless because if meters on the switchboard be viewed from an angle their readings will be erroneous. Hence the really valuable working edge of this common form of stand is proportional to its length. Becoming aware of this fact, I have designed a test stand in which no edge of the table is lost as working space. And since I have concentrated my switchboard appliances onto a centrally located box having a raised position above the table, I have lost practically no area of the table and I have materially shortened the wires in the system of electrical distribution thus greatly reducing the seriously objectionable resistance and capacity of long wires on a large board. Therefore I have attained the first object of my invention.

Now it becomes apparent that with either the common form of test stand or with my new type, the table itself and its heavy equipment is too cumbersome to be made portable, therefore either test stand as described without special provision, would be limited in its scope to the testing of generators, starting motors, etc. that have been removed from an automobile but would not be adapted to being moved up along the side of a car to make tests direct on a defective electrical device. This demand for a portable outfit, has led to the development of the test cart already mentioned. These wheeled carriages are equipped with storage batteries and some form of switchboard appropriate to testing electrical units on a car. But these outfits are differently constructed from mine and heretofore no attempt has been made to combine the valuable features of the test stand with those of the test cart. So in addition to making a small compact test stand of very large capacity, I have made further improvement by broadening the scope of my outfit, to include the portable feature of the test cart. Therefore I have attained the second object of my invention by designing a table fitted with appropriate testing appurtenances and a test cart that can cooperate jointly as a highly efficient test stand.

Although I am aware that prior to my invention both test stands and test carts have been produced, and each in different forms, I am not aware that the particularly advantageous features of each have heretofore been combined in cooperating units as herein set forth.

I claim:

1. In a stand for testing automotive electrical devices either when removed from an automobile or installed thereon, the combination of a table provided with bench devices for temporarily holding and driving electrical units during testing operations on them, with an upright testing carriage provided with a switchboard mounted at a greater height than the table, the said table having a top provided with a drop-leaf bridging an entry which may be opened to receive the carriage within the limiting dimensions of the table and then shut, thus enclosing the carriage centrally within and projecting upwardly through the table top in a position such that the switchboard is available for use in cooperation with the holding and driving devices mounted on the table.

2. In a stand for testing automotive electrical devices either when removed from an automobile or installed thereon, the combination of a table provided with bench devices for temporarily holding and driving electrical units during testing operations on them, with an upright testing carriage of greater height than the table and arranged to occupy a central position within and projecting upwardly through the top of the table when used cooperatively with the holding and driving devices thereon, the said testing carriage being provided with wheels, a frame mounted on the wheels, a storage battery platform mounted on the frame, handles attached to the frame with which to move the carriage, vertical members rigidly mounted on the frame, a roofed box-shaped switchboard fixed to the upper extremities of said vertical members, the said box-shaped switchboard being composed of four instrument panels joined consecutively at right angles to each other along their vertical edges and each provided with appurtenances for testing a specific class of electrical devices, storage batteries on the aforesaid battery platform, and a system of electrical conductors joining said switchboard appurtenances with said storage batteries, all substantially as described.

CHARLES W. MORGAN.